United States Patent
Auclair et al.

[11] Patent Number: 6,111,193
[45] Date of Patent: Aug. 29, 2000

[54] MAST CLAMP HOOK AND ASSEMBLY

[75] Inventors: William T. Auclair, Winsted; John W. Auclair, Norfolk; William J. Balfour, Winsted, all of Conn.

[73] Assignee: Electric Motion Company, Inc., Winsted, Conn.

[21] Appl. No.: 09/210,159

[22] Filed: Dec. 11, 1998

[51] Int. Cl.[7] .............................. H02G 7/00; H02G 7/05
[52] U.S. Cl. ............... 174/44; 174/40 CC; 174/40 R; 174/170; 174/171; 439/100; 439/110
[58] Field of Search .................... 174/44, 40 CC, 174/40 R, 40 TD, 45 R, 45 TD, 170, 171, 138 R, 138 F, 161 R, 161 F, 163 R, 163 F; 439/100, 110, 111, 112, 113, 114

[56] References Cited

U.S. PATENT DOCUMENTS

| | | | |
|---|---|---|---|
| 1,625,716 | 4/1927 | Edwards | 248/66 |
| 2,967,039 | 1/1961 | Garman | 248/230.9 |
| 3,036,801 | 5/1962 | Cemashko | 248/72 |
| 3,778,537 | 12/1973 | Miller | 174/40 CC |
| 3,801,731 | 4/1974 | Hansen | 174/163 F |
| 4,078,277 | 3/1978 | McCracken | 24/115 R |
| 4,461,521 | 7/1984 | Sachs | 339/14 R |
| 4,771,137 | 9/1988 | Thompson | 174/163 F |
| 5,131,856 | 7/1992 | Auclair | 439/100 |
| 5,988,318 | 11/1999 | Krause | 182/222 |
| 6,040,525 | 3/2000 | Chauquet et al. | 174/40 CC |

*Primary Examiner*—Kristine Kincaid
*Assistant Examiner*—Mark Olds
*Attorney, Agent, or Firm*—Alix, Yale & Ristas, LLP

[57] ABSTRACT

A mast clamp assembly including a strap, a drop wire clamp, and a hook. The ribbon-like strap forms a loop which engages a utility pole or mast. The drop wire clamp includes a clamp for clamping to the drop wire and a loop which engages the hook. The hook includes a back wall and first and second side walls. The loop of the drop wire is received in loop mounting slots in the side walls and engages a protrusion on each side wall. Each side wall also has a strap mounting opening having a triangular-shaped lower portion and a rectangular-shaped upper portion. The hook is mounted on the strap by inserting the strap, bottom edge first, through a slot in the back wall into the lower portion of the strap mounting openings and rotating the hook around the strap such that the upper edge of the strap rotates into the upper portion of the strap mounting opening and the strap engages the hook back wall.

23 Claims, 5 Drawing Sheets

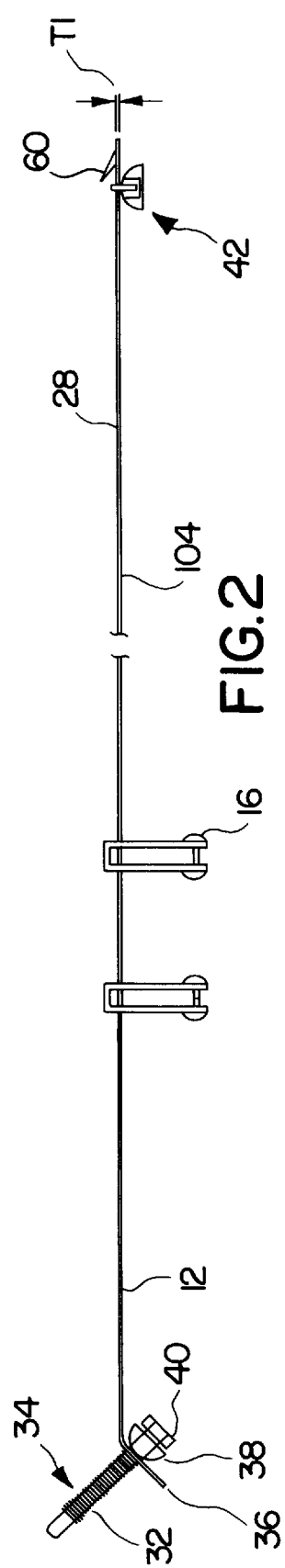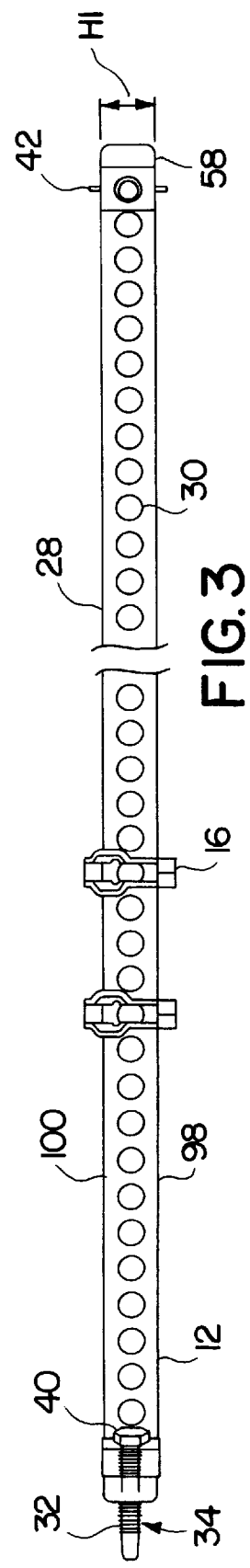

MAST CLAMP HOOK AND ASSEMBLY

BACKGROUND OF THE INVENTION

This invention relates generally to apparatus for supporting wire and cable. More particularly, the present invention relates to apparatus for supporting drop wires to provide strain relief for the connection between the drop wire and the supply system.

A drop wire is used to connect a pole/mast mounted service wire providing telephone signals, cable television services, etc. to a subscriber. Drop wire clamps are typically used to support the weight of the drop wire and relieve stress on the connection between the drop wire and the pole or mast. Generally the drop wire clamp includes a clamp portion for gripping the drop wire and a hook or loop portion which is mounted to the mast/pole via a mechanical mounting device.

The mounting devices used to mount the drop wire clamp to the pole/mast have been subject to several problems. The mounting devices are subject to dynamic loads and wear resulting from wind induced movement of the drop wire in addition to the static load of the weight of the drop wire Multipurpose mounting devices have often been subject to failure due to the wear and the combination of the static and dynamic loads. Purpose built mounting devices have been more resistant to the above-recited failure mechanisms but are generally configured to mount a fixed number of drop wire clamps. Consequently, additional mounting devices are required if the number of drop wires exceeds the mounting capacity of the device or the device has unused capacity if the number of drop wires is less than the capacity of the device.

SUMMARY OF THE INVENTION

Briefly stated, the invention in a preferred form is a mast clamp assembly which includes a strap subassembly having a ribbon-like strap forming a loop which engages a utility pole or mast. A drop wire clamp includes a clamp for clamping to the drop wire and a loop which engages a hook suspended on the strap. The hook includes a back wall and first and second side walls which extend longitudinally from the back wall. Each of the side walls has a loop mounting slot for receiving the loop of the drop wire clamp and a strap mounting opening for receiving the strap. The hook is mounted on the strap by inserting the strap, bottom edge first, through a slot in the back wall into the strap mounting openings and rotating the strap within the hook (or the hook about the strap). Rotating the hook causes the strap to engage the back surface of the strap mounting opening. The drop wire clamp is mounted on the hook by inserting the loop into the loop mounting slots where it engages a laterally extending protrusion on each side wall.

The shape of the protrusions is complementary to the shape of the loop to maximize the surface area of the protrusion which is engaged by the loop. Such engagement spreads out the wear caused by wind-induced movement of the drop wire.

The strap mounting opening comprises a triangular-shaped lower portion and a rectangular-shaped upper portion which extends upward from the rear of the lower portion. The base surface of the lower portion has a length that is greater than or equal to the width of the strap to allow the strap to be fully inserted into the strap mounting opening. The triangular shape of the strap mounting opening allows the hook to be rotated. The combined height of the back surfaces of the upper and lower portions of the strap mounting opening and the height of the slot is also greater than or equal to the width of the strap so that the hook may be fully rotated about the strap. The width of the strap mounting opening upper portion and the position of the slot and a knee formed by the intersection of the hypotenuse of the strap mounting opening lower portion and the strap mounting opening upper portion are selected to prevent engagement between the strap and strap mounting opening that would prevent the strap from being fully rotated into the vertical position.

It is an object of the invention to provide a new and improved mast clamp assembly.

It is also an object of the invention to provide a new and improved hook for a mast clamp assembly which hook and clamp assembly have an efficient and low cost construction.

It is further an object of the invention to provide a hook for a mast clamp assembly which may be easily added to or removed from the mast clamp assembly.

Other objects and advantages of the invention will become apparent from the drawings and specification.

BRIEF DESCRIPTION OF THE DRAWINGS

The present invention may be better understood and its numerous objects and advantages will become apparent to those skilled in the art by reference to the accompanying drawings in which:

FIG. 2 is an enlarged top view of the mast clamp assembly of FIG. 1;

FIG. 3 is a front view of the mast clamp assembly of FIG. 2;

DETAILED DESCRIPTION OF THE PREFERRED EMBODIMENT

Figure 1:
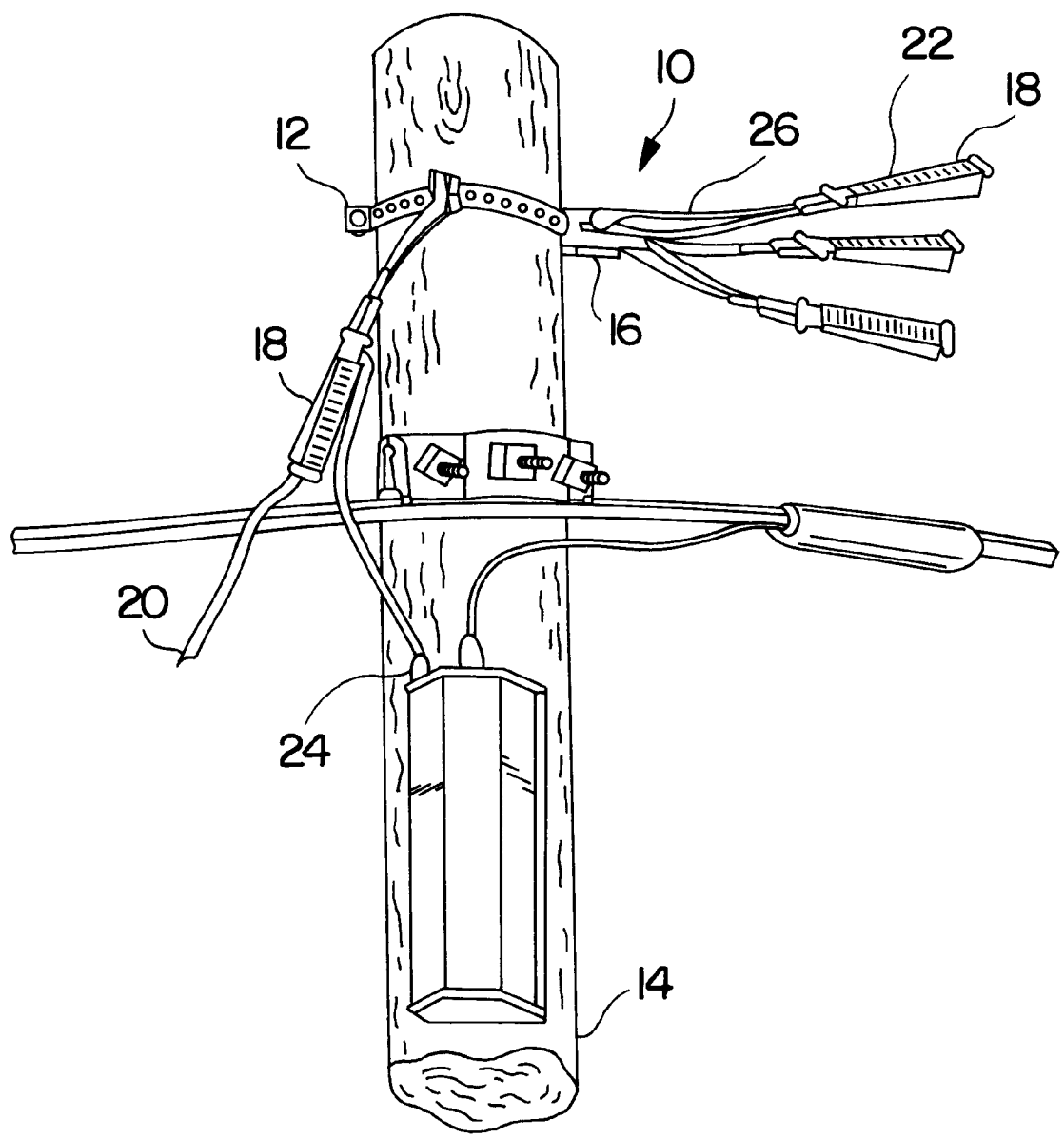
FIG. 1 is a perspective view, partly broken away, of a mast clamp assembly in accordance with the invention installed on a utility pole.

With reference to the drawings wherein like numerals represent like parts throughout the several figures, a mast clamp assembly in accordance with the present invention is generally designated by the numeral 10. The mast clamp assembly 10 includes a strap subassembly 12 that is mounted to a utility pole or mast 14. A hook 16 engages the strap subassembly 12 and a drop wire clamp 18 to mount the drop wire to the utility pole 14.

Drop wire clamps 18 are well known in the art and generally comprise a clamp portion 22 for clamping a drop wire 20 which extends from a service connection 24 on the utility pole 14 to a load center such as a house. A hook or loop portion 26 of the drop wire clamp 18 mounts the clamp portion 22 to the hook 16. The drop wire clamp 18 supports the weight of the drop wire 20, providing strain relief for the service connection 24.

The strap subassembly 12 includes an elongated ribbon-like flexible metal strap 28. The strap 28 includes a plurality of circular apertures 30 which are spaced substantially the entire length of the strap 28. The shank 32 of a bolt 34 is threaded through an aperture 30 on a first end 36 of the strap 28. Preferably, a first shoulder nut 38 is disposed intermediate the head 40 of the bolt 34 and the surface of the strap 28, with the shank 32 extending through an unthreaded opening in the shoulder nut 38. A retainer 42 is slidably mounted on the strap 28.

Figure 7:
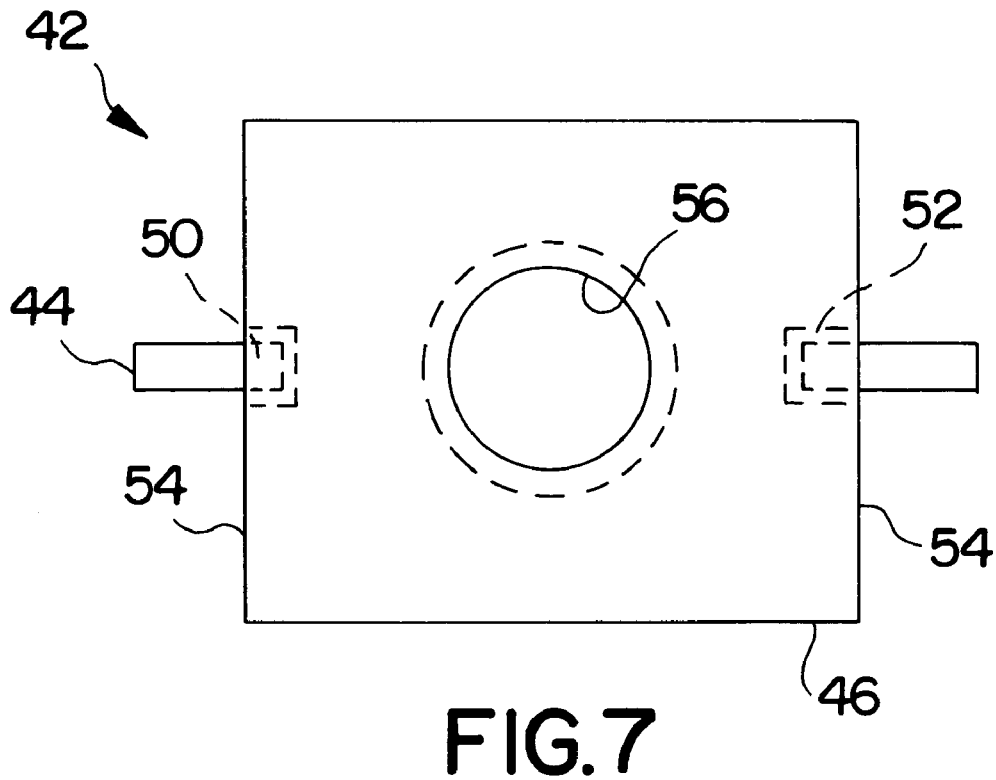
FIG. 7 is an enlarged front view, partly in phantom, of the retainer of FIG. 2.
Figure 8:
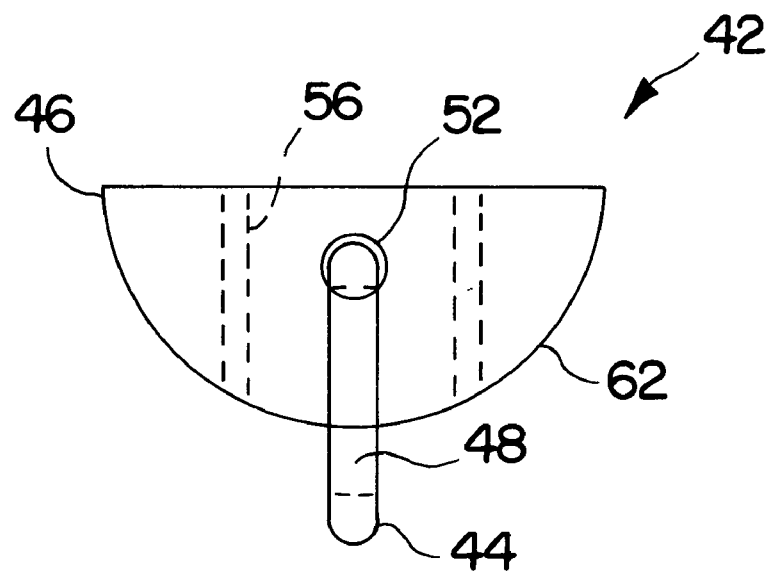
FIG. 8 is an end view of the retainer of FIG. 7.

The retainer 42 includes a retainer clip 44 which is rotatably mounted to a second shoulder nut 46, defining an opening 48 for receiving the strap 28. In the embodiment shown in FIGS. 7 and 8, the end portions 50 of the C-shaped retainer clip 44 are received in a pair of blind bores 52 in the opposite ends 54 of the second shoulder nut 46. A threaded opening 56 extends through the second shoulder nut 46 for receiving the threaded shank 32 of the bolt 34. The distal end portion 58 of the strap 28 is upset to form a tang 60 such that the retainer 42 is captured on the strap 28. It should be noted that the first and second shoulder nuts 38, 46 have a curved surface 62 positioned to engage the strap 28. The utility pole/mast 14 may have an irregular surface which could cause the bolt head 40 to be cocked relative to the strap 28. The rounded engagement surface 62 on each shoulder nut 38, 46 ensures that the shoulder nut 38, 46 engages the strap 28 along at least a line of contact.

Figure 5:
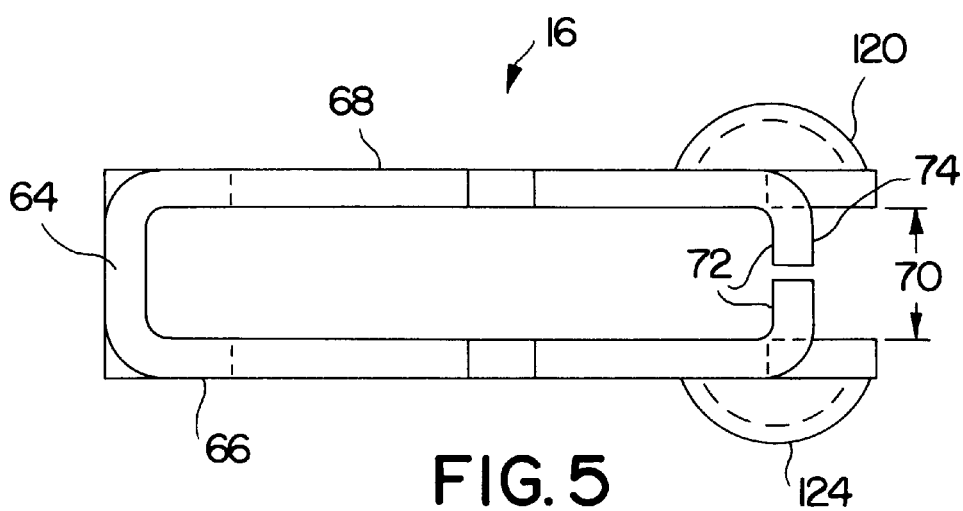
FIG. 5 is a top view, partly in phantom, of the hook of FIG. 4.
Figure 6A:
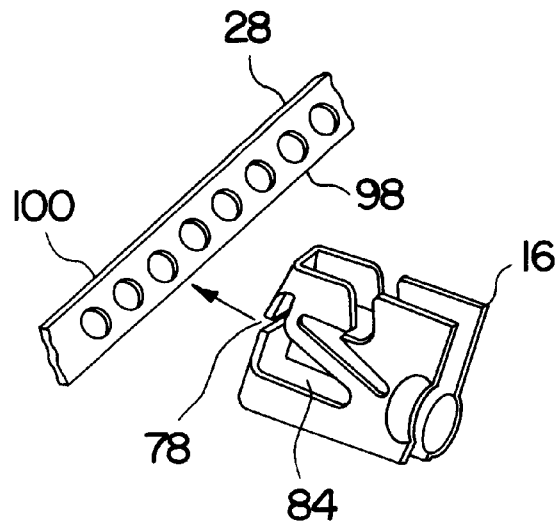
FIGS. 6a, 6b and 6c illustrate installation of the hook of FIG. 1 on the strap of FIG. 1.
Figure 6B:
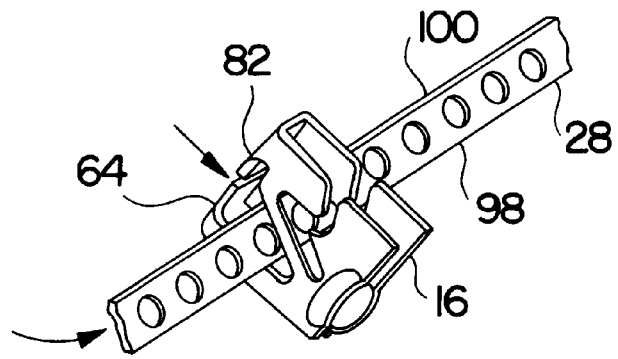
Figure 6C:
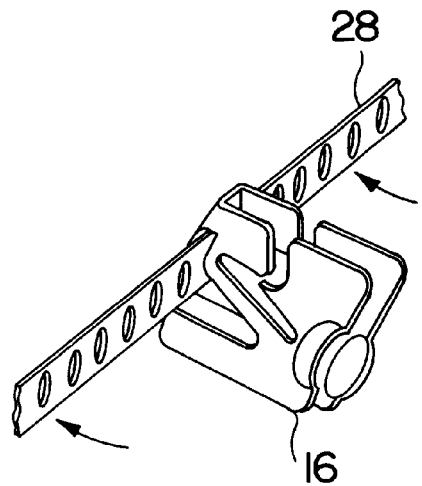

With reference to FIGS. 6a, 6b and 6c, the hooks 16 are removably mounted to the strap 28. Therefore, surplus hooks 16 may be removed for use at another location or additional hooks 16 may be added to support a large number of drop wires 20. With additional reference to FIGS. 4 and 5, each hook 16 is preferably formed in a stamping process from sheet metal and has a back wall 64 and oppositely disposed side walls 66, 68 which are separated by a gap 70. A tab 72 extends inwardly from the front of each side wall 66, 68 and cooperates with the opposite tab 72 to provide a partial front wall 74. Preferably, the tabs 72 are positioned adjacent the top edge 76 of the side walls 66, 68.

A horizontal slot 78 in the back wall 64 provides access to oppositely disposed strap mounting openings 80 in each side wall 66, 68. Each strap mounting opening 80 has upper and lower portions 82, 84. The lower portion 84 has the shape of a right triangle where the base 86 is substantially parallel to the bottom edge 88 of the side wall 66, 68 and the hypotenuse 90 extends upwardly and backwardly from the front end 92 of the base 86. The upper portion 82 has a substantially rectangular shape and extends upwardly from the lower portion 84 adjacent and substantially parallel to the back wall 64 of the hook 16 to an upper end 94. Hypotenuse 90 and the upper portion 82 of the strap mounting opening 80 form a knee 96. Alternatively, the strap mounting opening may comprise a single triangular shaped opening where the hypotenuse extends upwardly and backwardly from the front end of the base to the top end of the opening without a knee being formed. However, this design produces a less compact hook.

As shown in FIGS. 6a, 6b, and 6c, the hook 16 is installed on the strap 28 by inserting the strap bottom edge 98 first through the slot 78 and into the lower portion 84 of each strap mounting opening 80. After the upper edge 100 of the strap 28 has been inserted through the slot 78, the hook 16 is rotated about the strap 28 such that the upper edge portion 100 of the strap 28 moves into the upper portion 82 of the strap mounting opening 80 and the lower edge portion 98 moves backward toward the back wall 64. When the hook 16 is fully installed, the strap 28 extends substantially parallel to the back wall 64 of the hook 16. The hook 16 may be removed by reversing this process.

It is important to maintain certain relationships between the dimensions of the strap 28 and the dimensions of the slot 78 and strap mounting opening 80 to ensure that the hook 16 is easily mountable on the strap 28. For example, the length L1 of the base 86 of lower portion 84 and the combination of the height H2 of the lower portion 84, the height H3 of slot 78, and the height H4 of upper portion 82 must be at least equal to the width H1 of the strap 28 (the height of the strap when it is installed). A lower portion 84 having a base length L1 in accordance with this relationship will allow the strap 28 to fully inserted into the strap mounting opening 80, where the trailing, upper edge 100 of the strap 28 clears the upper edge of the slot 78, before the strap 28 is rotated into position. Similarly, if the combined height H2+H3+H4 of the lower portion 84, the slot 78, and the upper portion 82, is less than the width H1 of the strap 28, the upper edge 100 of the strap 28 will engage the upper end 94 of upper portion 82 before the strap 28 is fully rotated into a vertical position. The height H3 of slot 78 should be at least three times the thickness T1 of the strap 28. A slot 78 having a height H3 in accordance with this relationship will allow the strap 28 to be inserted at an angle through the slot 78 and into the lower portion 84 of the strap mounting opening 80, as shown in FIGS. 6a and 6b. The width W1 of upper portion 82 and the position of slot 78 and knee 96 are dependent on the width H1 of the strap 28. It should be appreciated that if the width W1 of upper portion 82 is too narrow and/or the position of knee 96 is too low, the upper edge 100 of the strap 28 will engage the front surface 102 of the back wall 64 and the front surface 104 of the strap 28 (FIG. 2) will engage the knee 96 preventing the strap 28 from being fully rotated into the vertical position.

Figure 4:
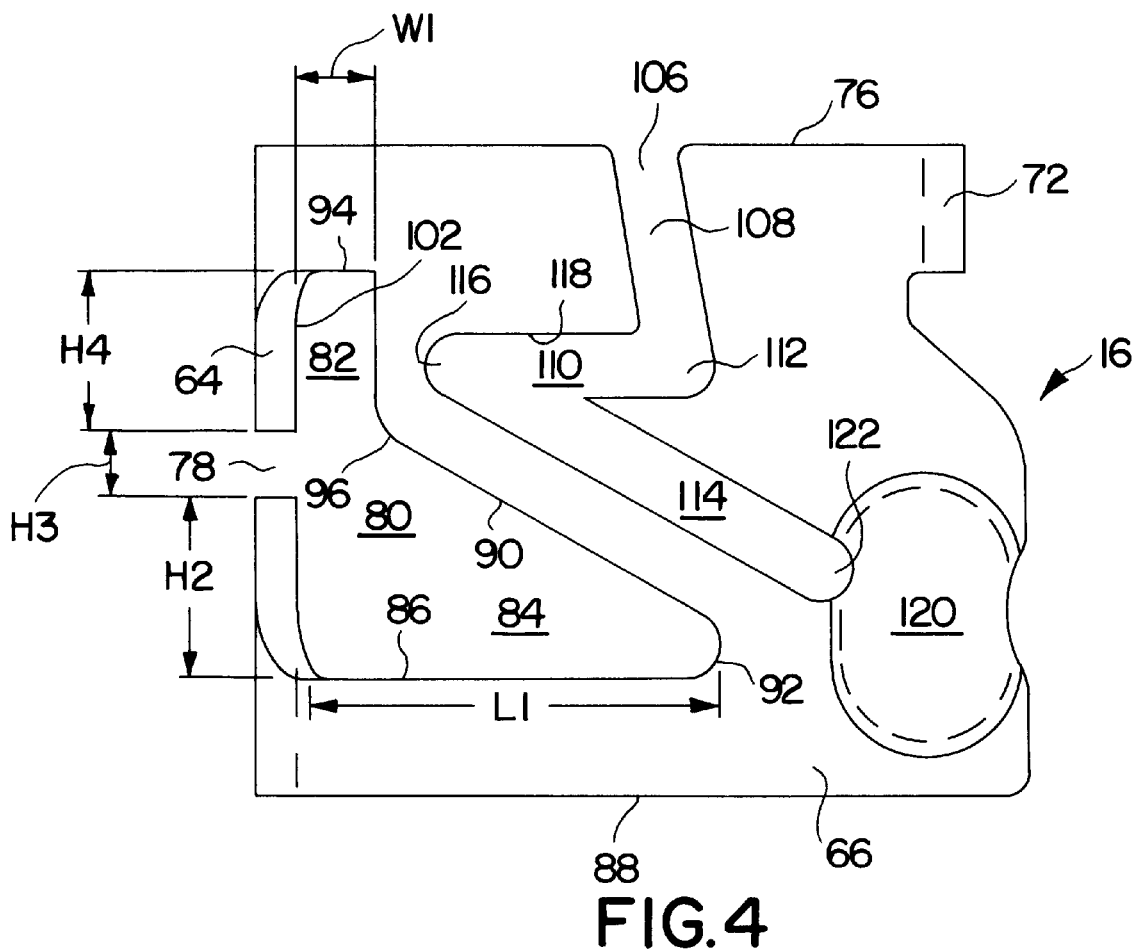
FIG. 4 is an enlarged side view of the hook of the mast clamp assembly of FIG. 1.

Each side wall 66, 68 of the hook 16 also includes a loop mounting slot 106 for receiving and mounting the loop portion 26 of a drop wire clamp 18. Each loop mounting slot 106 includes an upper segment 108 extending downward from the upper edge 76 of the side wall 66, 68. An intermediate segment 110 extends rearward from the lower end 112 of the upper segment 108. A lower segment 114 extends forward and downward from the rear end 116 of the intermediate segment 110. As shown in FIG. 4, the intermediate segment 110 may be substantially parallel to the upper and lower edges 76, 88 of the side wall 66, 68 and the lower segment 114 may be substantially parallel to the hypotenuse 90 of the lower portion 84 of the strap mounting opening 80. Should wind-induced movement of the drop wire 20 cause the drop wire clamp loop 26 to move upward in the loop mounting slot 106, the upper shoulder 118 formed by the intermediate segment 110 engages the loop 26 to prevent the loop 26 from exiting the slot 106.

Each side wall 66, 68 of the hook 16 further includes a protrusion 120 that extends outward from the side wall 66, 68. The protrusion 120 is positioned at the lower end 122 of the lower segment 114 of the loop mounting slot 106. Preferably, the lower end 122 of the lower segment 114 extends into the protrusion 120, as shown in FIG. 4. The shape of the protrusion is selected to cooperate with the shape of the drop wire loop 26 such that the inner side of the drop wire loop 26 engages the lower end 122 of the lower segment 114 and the outer surface 124 of at least a portion of the protrusion 120. The additional contact area provided by such engagement provides a large increase in the resistance to wear by movement of the loop 26 within the slot 106. The protrusion 120 also provides greater mechanical strength to the lower front portion of the side walls 66, 68.

In a preferred installation, the strap 28 is tightly wrapped around the utility mast/pole 14 and a selected aperture 30 of the strap 28 and the threaded opening 56 of the second shoulder nut 46 are brought into alignment with the threaded shank 32 of the bolt 34. The retainer clip 44 is pivoted such that it is not in alignment with the shank 32 of the bolt 34. The shank 32 of the bolt 34 is threaded through the opening 56 of the second shoulder nut 46 such that the shank 32 extends through the selected aperture 30 of the strap 28. Engagement between the shank 32 of the bolt 34 and the inner edge of the aperture 30 retains the strap 28 in place on the utility mast/pole 14. A drop wire clamp 18 is mounted on the drop wire 20 in a conventional manner. The loop portion 26 of the drop wire clamp 18 is positioned over the loop mounting slot 106 and inserted therein.

While preferred embodiments have been shown and described various modifications and substitutions may be made thereto without departing from the spirit and scope of the invention. Accordingly, it is to be understood that the present invention has been described by way of illustration and not limitation.

What is claimed is:

1. A hook for a mast clamp assembly having a ribbon-like strap and a drop wire clamp including a loop portion, the hook comprising:

first and second side walls extending vertically from a bottom edge to a top edge and longitudinally from a rear edge to a front edge, each of the side walls having a loop mounting slot extending downward from the top edge to a bottom end for receiving the loop portion of the drop wire clamp and a strap mounting opening extending forward from the rear edge for receiving the strap, the strap mounting opening having a substantially triangular-shaped portion; and a back wall extending from the rear edge of the first side wall to the rear edge of the second side wall, the back wall having front and rear surfaces and defining a slot extending longitudinally from the rear surface to the front surface to provide communication with the strap mounting openings of the first and second side walls.

2. The hook of claim 1 wherein the triangular-shaped portion of each strap mounting opening includes base, hypotenuse and back surfaces, the front surface of the back wall defining the back surface of a lower portion, the base surface extending substantially parallel to the bottom edge of the side wall from the front surface of the back wall to a front end and the hypotenuse surface extending upward and rearward from the front end of the base surface.

3. The hook of claim 2 wherein the strap mounting opening further has a rectangular-shaped upper portion extending upward from the triangular-shaped portion to a top end, the upper portion including front and back surfaces, the front surface of the back wall defining the back surface of the upper portion and the front surface of the upper portion extending from a upper end to the hypotenuse surface of the triangular-shaped portion, the front surface of the upper portion and the hypotenuse surface of the triangular-shaped portion defining a knee.

4. The hook of claim 2 wherein each loop mounting slot comprises an upper segment extending downward from the top edge of the side wall to a lower end, an intermediate segment extending rearward from the lower end of the upper segment to a rear end, and a lower segment extending substantially parallel to the hypotenuse surface of the triangular shaped portion of the strap mounting opening from the rear end of the intermediate segment to the bottom end of the loop mounting slot.

5. The hook of claim 1 wherein each loop mounting slot comprises an upper segment extending downward from the top edge of the side wall to a lower end, an intermediate segment extending rearward from the lower end of the upper segment to a rear end, and a lower segment extending forward and downward from the rear end of the intermediate segment to the bottom end of the loop mounting slot.

6. The hook of claim 5 wherein the intermediate segment is substantially parallel to the top and bottom edges of the side walls.

7. The hook of claim 5 wherein the intermediate segment has an upper surface defining a shoulder, wherein the shoulder is engageable by the loop portion of the drop wire clamp to inhibit removal of the loop portion.

8. The hook of claim 1 wherein each of the side walls further has inner and outer surfaces, the inner surfaces of the side walls defining a gap therebetween.

9. The hook of claim 8 wherein each of the side walls further has a protrusion disposed adjacent the bottom end of the loop mounting slot, the protrusion extending laterally outward from the outer surface of the side wall.

10. The hook of claim 8 wherein each of the side walls further has a tab disposed adjacent the top edge of the side wall, the tab extending inwardly from the inner surface of the side wall, the tabs of the side walls cooperating to substantially close the gap.

11. A mast clamp assembly for supporting a drop wire on a vertically extending utility support device such as a pole or mast, the assembly comprising:

a strap subassembly including a ribbon-like strap and a mounting device for forming the strap into a loop which is engageable with the utility support device, the strap having upper and lower edges and front and back surfaces, the back surface being engageable with the utility support device to support the strap subassembly on the utility support device;

a drop wire clamp including a loop and a clamp engageable with the drop wire; and a hook including a vertically extending back wall and first and second side walls extending longitudinally from the back wall, each of the side walls having a loop mounting slot for receiving the loop of the drop wire clamp and a strap mounting opening for receiving the strap, the strap mounting opening having a triangular-shaped lower portion and a rectangular-shaped upper portion extending upward from the lower portion to a top end, the back, wall having a front surface and defining a slot disposed adjacent the strap mounting openings of the side walls;

wherein the hook is mounted on a strap, by inserting the strap bottom edge first through the slot and into lower portion of the strap mounting openings and rotating the hook about the strap, whereby a top edge of the strap is positioned adjacent the top end of the upper portion of the strap mounting openings and the front surface of the back wall of the hook engages the back surface of the strap, and the drop wire clamp is mounted on the hook by inserting the loop into the loop mounting slots.

12. The mast clamp assembly of claim 11 wherein each of the side walls further has inner and outer surfaces and a protrusion and the loop mounting slot has a distal end which is engaged by the loop of the drop wire clamp, the protrusion being disposed adjacent the distal end of the loop mounting slot and extending laterally outward from the outer surface of the side wall.

13. The mast clamp assembly of claim 12 wherein the loop of the drop wire clamp has an inner surface defining a shape and the protrusions of the side walls each have an outer surface defining a shape, a shape of the protrusions being complementary to the shape of an inner surface of the loop wherein the inner surface of the loop engages the distal end of the loop mounting slot and at least a portion of the outer surface of the protrusions.

14. The mast clamp assembly of claim 11 wherein the upper and lower edges of the strap define a height (H1) and the lower portion of each strap mounting opening includes base, hypotenuse and back surfaces, the base surface having a length (L1) wherein $L1 \geq H1$.

15. The mast clamp assembly of claim 14 wherein the back surface of each lower portion has a height (H2), the slot has a height (H3), and the upper portion of the strap mounting opening includes a back surface having a height (H4), wherein $H2+H3+H4 \geq H1$.

16. The mast clamp assembly of claim 14 wherein the front and back surfaces of the strap define a thickness (T1) and the slot has a height (H3), wherein $H3 \geq 3 \times T1$.

17. The mast clamp assembly of claim 11 wherein the upper portion of the strap mounting opening has a width (W1) and a front surface and the lower portion of the strap mounting opening has base, hypotenuse and back surfaces, the front surface of the upper portion and the hypotenuse surface of the lower portion defining a knee, wherein the width (W1) of upper portion has a predetermined value and the slot and the knee are positioned at predetermined locations whereby the strap may be inserted into the strap mounting opening and the hook may be rotated about the strap.

18. The mast clamp assembly of claim 11 wherein the strap further has first and second end portions, the first end portion including a tang extending outwardly from the front surface.

19. The mast clamp assembly of claim 18 wherein the second end portion of the strap defines an opening and the mounting device comprises a bolt having a threaded shaft extending through the opening in the second end portion of the strap and a retainer slidably mounted to the strap, the retainer having a threaded opening for engaging the shaft of the bolt.

20. The mast clamp assembly of claim 19 wherein the retainer includes a retainer clip rotatably mounted to a nut defining the threaded opening, the retainer clip and nut defining an opening for receiving the strap.

21. The mast clamp assembly of claim 19 wherein the opening in the second end portion of the strap has a threaded surface engaged with the threaded shaft of the bolt.

22. A mast clamp assembly for supporting a drop wire on a vertically extending utility support device such as a pole or mast, the assembly comprising:
  a strap subassembly including a ribbon-like strap defining a loop which is engageable with the utility support device to support the strap subassembly on the utility support device;
  a drop wire clamp including a loop and a clamp engageable with the drop wire; and
  a hook including a back wall and first and second side walls extending longitudinally from the back wall, each of the side walls having a loop mounting slot for receiving the loop of the drop wire clamp, a laterally extending protrusion disposed adjacent the loop mounting slot, and a strap mounting opening having a back surface, the back wall defining a slot providing communication with the strap mounting opening through the back surface of the strap mounting opening;
  wherein the hook is mounted on a strap by inserting the strap bottom edge first through the slot into the strap mounting openings and rotating the hook about the strap, whereby the strap engages the back surface of the strap mounting opening, and the drop wire clamp is inserted into the loop mounting slots to engage the protrusions.

23. A hook for a mast clamp assembly having a ribbon-like strap and a drop wire clamp including a loop portion, the hook comprising:
  first and second side walls extending vertically from a bottom edge to a top edge and longitudinally from a rear edge to a front edge, each of the side walls having inner and outer surfaces, a loop mounting slot extending downward from the top edge to a bottom end for receiving the loop portion of the drop wire clamp, a protrusion adjacent the bottom end of the loop mounting slot extending laterally outward from the outer surface of the side wall, and a strap mounting opening extending forward from the rear edge for receiving the strap; and
  a back wall extending from the rear edge of the first side wall to the rear edge of the second side wall, the back wall having front and rear surfaces.

* * * * *